United States Patent Office

3,544,530
Patented Dec. 1, 1970

3,544,530
FURFURYL ALCOHOL CO-POLYMERS
Robert C. Shaffer, Playa Del Rey, Calif., assignor to Hitco, a corporation of California
No Drawing. Filed Oct. 1, 1968, Ser. No. 764,308
Int. Cl. C08f 5/04
U.S. Cl. 260—78.5
2 Claims

ABSTRACT OF THE DISCLOSURE

Useful synthetic resins are prepared by copolymerizing furfuryl alcohol with an ester prepolymer of maleic acid or anhydride and a polyhydric alcohol.

BACKGROUND OF THE INVENTION

In preparing high temperature, corrosion and ablative resistant structures, it is the practice to impregnate refractory materials with a synthetic resin, shape the structure to the desired form, and thereafter finally cure the resin at the necessary elevated temperatures. Useful resins used heretofore for this purpose have included, for example, phenolic resins, epoxy resins and the like. With the advent of aerospace products, the requirements for materials having suitable ablative characteristics have become even more critical and, accordingly, the presence of carbonized products has found particularly acceptable application in this field. Thus, in preparing such products, resin impregnated refractory materials such as silica, carbon and graphite fibers and fabrics have been heated at high temperatures in order to reduce the impregnated resins substantially to carbon. The resulting products have improved high temperature characteristics due to the reduced heat conductivity and corrosion resistance of the carbonized materials present therein. The properties of the resins used to impregnate and coat the refractory fiber materials must be such that during the pyrolysis outgasing problems are minimized with a substantial amount of the original resin material being retained in the form of carbon on the product structure. Thus, resin products, which upon carbonization undergo extensive volatilization, will not only yield a product in which a substantial amount of the pyrolezing resin products have been driven off, but there is the additional danger that outgasing may occur at such a rate and in such a manner that the integrity of the refractory fibers or cloth may be impaired. In addition, where a substantial portion of the resin has been decomposed during the carbonization, a weakened structure may also result.

In preparing the aforementioned resin impregnated fiber or fabric products, it is especially desirable to incorporate a resin which can be cured to an intermediate stage whereby the partially cured resins are essentially solid in nature and stable and thereby can be conveniently stored and handled. Partially cured resins which are fluid or tacky at ambient temperatures have the disadvantage that the resin may run or other wise flow during storage prior to lay-up of the materials into their final form. Such an undesired resin flow usually results in a non-uniformly impregnated fabric. In addition, it is evident that resins having a tacky quality are somewhat undesirable in that they are difficult to handle during lay-up procedures. Further, it is a necessary requirement that partially cured resins not undergo substantial additional curing during storage since hard and infusable resulting materials are difficult to form or otherwise mold into the shaped final products. An example of such a composition for a resin that is difficult to maintain in the partially cured condition is described in U.S. Pat. No. 2,999,829, Aqueous Shell Molding Composition Comprising Maleic Acid, Furfuryl Alcohol and Urea, issued to Treat and Shaffer.

Although some resins have been found to possess the high carbon retention properties noted previously, and may be partially cured and thereafter stored under ambient conditions, these materials often have other undesirable characteristics. For example, certain resins, reacting by condensation, give off rather large quantities of water upon further curing. Where significant quantities of water are driven from the resin structure during cure and carbonization, danger of fiber or fabric degradation is again significant. At best, such materials must be carefully treated at elevated temperatures to remove essentially all of the water in such a manner so as not to impair the integrity and uniformity of the fibers or resin matrix. Certain resin products have also been shown to exhibit excessive shrinkage characteristics on post cure and carbonization. Such shrinkage is undesirable in view of critical dimensional requirements of the product being formed. Other attempts to polymerize furfuryl alcohol into a useful B-stageable resin include homopolymerization by using approximately 1% maleic anhydride and curing the product at 350° F. for 16 hours. This results in an excessively long cure reaction unless the system is modified with other additives; the addition of additives however degrades the desirable physical characteristics of the furfuryl alcohol resin. When the furfuryl alcohol-maleic anhydride ratio is increased to give optimum resin properties, the cure reaction is extremely rapid and uncontrollable. If a saturated anhydride such as succinic is used to cure the furfuryl alcohol, an unsatisfactory cure results with some crystals of the anhydride remaining unreacted in the mixture. Resin materials prepared by reacting equivalent weights of furfuryl alcohol and maleic anhydride are extremely brittle and are unsuitable for B-staging.

SUMMARY OF THE INVENTION

The resins of the invention comprise furfuryl alcohol copolymers of unsaturated dicarboxylic acid-polyhydric alcohol prepolymers. Different copolymers may be prepared having a variety of characteristics depending on the type of polyhydric alcohol utilized as well as the ratio of alcohol to dicarboxylic acid utilized in preparing the intermediate prepolymers. Such properties and the description of resin copolymer preparation are set forth more fully hereinbelow.

DESCRIPTION OF THE PREFERRED EMBODIMENT OF THE INVENTION

The resins of the invention are copolymers of furfuryl alcohol and intermediate polyesters of maleic acid or the coresponding anhydride and a polyhydric alcohol. The intermediate polyesters are referred to as prepolymers. The resins are prepared by copolymerizing the ethylenically unsaturated, polycarboxylic acid ester prepolymer with furfuryl alcohol. The prepolymers are prepared by reacting maleic acid or anhydride with a polyhydroxy compound.

Polyhydroxy compounds utilized in preparing the prepolymers are polyols having the general formula:

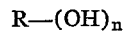

wherein $n$ is an integer between 2 and 4 and wherein R is a hydrocarbon group containing between 2 and about 20 carbon atoms. Other suitable materials include polyoxyalkylene glycols or polyalkylene glycol ethers of the general formula

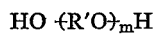

wherein R' is an alkyl group of between about 2 and about 4 carbon atoms and wherein $m$ is an integer of at least 2. Specific polyols which may be utilized include ethylene glycol, diethylene glycol, trimethylene glycol, triethylene glycol, tetraethylene glycol, 1,5-pentane diol, tetramethylene glycol (1,4-butylene glycol), 1,8-octane diol, glycerol, pentaerythritol, xylene glycol, polyoxyethylene glycol and polyoxypropylene glycol. Preferred mononuclear aromatic polyols are the polyhydric phenols such as hydroquinone, resorcinol and the like.

In preparing the ester prepolymers, the ratio of unsaturated dibasic acid or anhydride to the polyol may be varied within certain limits depending on the properties of the furfuryl alcohol copolymer desired. Accordingly, prepolymers prepared by reacting at least a slight stoichiometric excess of a mono-ethylenically unsaturated polybasic acid with a polyhydric alcohol are of relatively short chain length as compared to those wherein an excess of alcohol is used. Further, excess acid results in prepolymers characterized by fewer ester linkages and containing sufficient terminal acid groups to readily catalyze furfuryl alcohol copolymerization. Such prepolymers also yield copolymers which are generally non-elastic and upon carbonization have outstanding carbon yields and high modulus characteristics. Suitable stoichiometric ratios of dibasic acid to polyhydric alcohol are between about 0.5:1.0 and about 2:1 respectively with resulting ester prepolymers having molecular weights, for example, between about 300 and about 1,000.

On the other hand, where alcohols are present in at least slight stoichiometric excess, the ester prepolymers have a proportionately larger number of ester linkages and fewer acid terminal groups. However, where excessive alcohol:acid ratios are avoided, for example, greater than about 1:0.5, some acid groups will be present to initiate furfuryl alcohol copolymerization. The increased number of ester linkages also yield a more elastic furfuryl alcohol copolymer.

Where lower molecular weight polyols and especially the non-ether aliphatic polyols are used in prepolymers synthesis, i.e. ethylene glycol, diethylene glycol, trimethylene glycol, tetramethylene glycol, 1,5-pentane diol and the like, the furfuryl alcohol copolymers thereof possess medium modulus and carbon retention characteristics. Highest modulus and carbon retentions are exhibited by copolymers incorporating aromatic containing polyols such as hydroquinone, xylene diol, resorcinol, etc. which is apparently due to the manner in which the aromatic nucleus is carbonized. These products when fully cured are hard, brittle and infusible.

The copolymers of the invention are prepared by combining the furfuryl alcohol with the prepolymer esters. The ratio of furfuryl alcohol to maleic anhydride/polyol prepolymer can be within the range 0.1 to 3.0 moles of furfuryl alcohol to 1 equivalent of maleic anhydride in the polyester form. The preferred range is .8 to 1.2 furfuryl alcohol to 1 equivalent of maleic anhydride in the polyester. Preferred copolymer compositions are those utilizing an approximately equimolar ratio of furfuryl alcohol to ethylenic unsaturization sites present in the ester prepolymer.

The method of combining the furfuryl alcohol and ester prepolymer may be accomplished by mixing the two ingredients under ambient conditions and thereafter heating the mixture in order to react the resulting resin to the desired state. Suitable curing temperatures are between about 150 and about 500° F. and preferably between about 180 and about 400° F. The specific curing times and temperatures will depend upon the desired physical state of the resin and the particular use or treatment of the product. Where the resins are to be used for impregnating fibers or fabrics or in laminating, an intermediate or partial curing is usually preferred; this partial cure is sometimes referred to as "B"-stage. B-stage temperatures of about 200° F. are suitable for this purpose and thereafter the staged composition may be stored at ambient temperatures, without the cure reaction proceeding to a point where the polymer becomes hard and unusable.

Although applicant does not wish to be limited thereto, it is believed that the furfuryl alcohol-prepolymers copolymerization occurs at the sites of ethylenic unsaturation of the respective monomers and is catalyzed by the acid groups of the prepolymer. Accordingly, the characteristics of the true copolymers are differentiated from those of homopolymerized furfuryl alcohol, or the prepolymer esters or mixtures thereof. Further evidence of the nature of the copolymer has been established in view of attempts to copolymerize furfuryl alcohol with succinic anhydride which has the same basic structure as maleic anhydride except that no unsaturation exists. In this case, homopolymerization of the furfuryl alcohol occurred with crystals of succinic acid prevalent in the cured mass, thereby supporting the fact that ethylenic unsaturation present in maleic anhydride is essential to copolymerization of the acid or anhydride with furfuryl alcohol.

The cured copolymeric resins of the invention may be used in preparing coating compositions, pottings, castings, adhesives, impregnating compositions and the like, utilizing methods well known to those skilled in the art. One of the outstanding features of certain resins of the invention is that, when pyrolyzed at high temperatures, a substantial amount of the original resin weight is retained. This feature is particularly unexpected in view of the correspondingly low weight retention values possessed by similar materials when pyrolyzed under the same conditions. Accordingly, those copolymers are valuable in preparing carbonized, high-temperature, corrosion resistant and ablative products under conditions well known to those skilled in the art. Specifically, high silica fabric materials prepared by leaching glass fibers, as set forth in U.S. Pat. Nos. 2,491,761, 2,624,658 and 3,262,761 or carbonaceous fibers prepared by pyrolyzing cellulosic materials such as cotton, rayon and the like under controlled conditions, as disclosed, for example, in U.S. Pat. No. 3,294,489, may be impregnated with the resins of the present invention and thereafter pyrolyzed at temperatures of between about 800 and about 2000° F. the resulting products retain a substantial and desirable amount of the original resin volume and weight, and yet are characterized by the improved ablative and temperature and corrosion resistant properties taken on as a result of the pyrolysis.

In order to illustrate the resins and the properties of the products of the invention, the following examples are given in which parts and percents, unless otherwise indicated are set forth by weight:

EXAMPLE I

Two (2) mol equivalents of maleic anhydride were placed in a reaction vessel and the temperature raised to slightly above 380° F. One (1) mol equivalent of ethylene glycol was then added and thoroughly mixed while the temperature was maintained until a viscous liquid prepolymer was obtained. The prepolymer was then cooled and a portion thereof was thoroughly blended with an amount of furfuryl alcohol calculated to approximate a 1:1 mol equivalent ratio of furfuryl alcohol:maleic anhydride present in the prepolymer. The mixture was slowly heated to between 150 and 200° F. until the reaction commenced with the rate thereafter controlled by the amount of heating. When the product had reached the desired viscosity, heating was discontinued and the product rapidly cooled. The resulting copolymer was a highly viscous dark brown liquid which was soluble in organic solvents. The copolymer was used to impregnate fiber materials and upon additional heating to about 140° F. became non-tacky and was stable when stored under ambient conditions. Thereafter, the resin fiber composition could be molded and cured at about 350° F. to form a black, infusible solid matrix.

A similar copolymer was prepared by substituting xylene diol for ethylene glycol during prepolymer synthesis and otherwise following essentially the procedure set forth above.

EXAMPLE II

Two (2) mol equivalents of maleic anhydride were placed in a reaction vessel and the temperature raised to slightly above 380° F. One (1) mol equivalent of diethylene glycol was then added and thoroughly mixed while the temperature was maintained until a viscous liquid prepolymer was obtained. A similar procedure to that in Example I was then followed to produce a highly viscous dark brown co-polymer material which was stable when stored at 72° F. and which could thereafter be cured at about 350° F. to form a black, infusible solid matrix.

EXAMPLE III

Essentially the same procedure was followed as that in Example I except that 1 mol equivalent of xylene diol was substituted for ethylene glycol during prepolymer synthesis.

EXAMPLE IV

Essentially the same procedure was followed as that in Example I except that 1 mol equivalent of resorcinol was substituted for ethylene glycol during prepolymer synthesis. The resulting curable polymer was found.

EXAMPLE V 0.75 mol equivalents of maleic anhydride were placed in a reaction vessel and the temperature raised to slightly above 380° F. One (1) mol equivalent of diethylene glycol was then added and thoroughly mixed while the temperature was maintained until a viscous liquid prepolymer was obtained. The prepolymer was then cooled and a portion thereof was thoroughly blended with an amount of furfuryl alcohol calculated to approximate a 0.:1.0 mol equivalent ratio of furfuryl alcohol:maleic anhydride present in the prepolymer. Essentially the same procedure as that in Example I was followed to produce a curable polymer that had excellent shelf life at 72° F. and that exhibited a relatively high degree of flexibility and toughness when cured.

What is claimed is:

1. A copolymer of furfuryl alcohol and a liquid prepolymer of maleic acid or anhydride and a polyhydric alcohol wherein the polyhydric alcohol is selected from the group consisting of $$R-(OH)_n$$

wherein R is a hydrocarbyl group containing between about 2 and about 20 carbon atoms and $n$ is an integer between 2 and 4 and $$HO\text{-}(R'O)_m H$$

wherein R' is an alkyl group of between 2 and about 4 carbon atoms and $m$ is an integer of at least 2; wherein the ratio of acid: hydroxyl groups in the prepolymer is between 0.5:1 and about 2:1; and wherein the ratio of furfuryl alcohol to prepolymer is within the range of from 0.1 to 3.0 moles of furfuryl alcohol to 1 mole equivalent of maleic anhydride in the polyester form.

2. A copolymer of claim 1 wherein the ratio of acid: hydroxyl groups is between about 1:1 and 2:1 respectively.

References Cited

FOREIGN PATENTS

| | | |
|---|---|---|
| 169,779 | 3/1965 | U.S.S.R. |
| 184,442 | 7/1966 | U.S.S.R. |
| 213,345 | 3/1968 | U.S.S.R. |

WILLIAM H. SHORT, Primary Examiner

M. GOLDSTEIN, Assistant Examiner

U.S. Cl. X.R.

117—124, 145; 260—867

PO-1050
(5/69)

UNITED STATES PATENT OFFICE
CERTIFICATE OF CORRECTION

Patent No. 3,544,530            Dated December 1, 1970

Inventor(s) Robert C. Shaffer

It is certified that error appears in the above-identified patent and that said Letters Patent are hereby corrected as shown below:

Column 1, line 44, "pyrolezing" should read --pyrolyzing-- line 58, "other wise" should read --otherwise--. Column 4, line 38, "the" should read --The--. Column 5, line 32, "0.:1. should read --0.8:1.0--. Column 6, line 23, after "2:1" insert a comma (--,--).

Signed and sealed this 4th day of May 1971.

(SEAL)
Attest:

EDWARD M. FLETCHER, JR.        WILLIAM E. SCHUYLER, JR.
Attesting Officer               Commissioner of Patents